O. H. OLIVE.
WATER MOTOR.
APPLICATION FILED OCT. 22, 1914.

1,157,416.

Patented Oct. 19, 1915.
2 SHEETS—SHEET 1.

WITNESSES
F. C. Barry
Myron L. Clear

INVENTOR
Oliver H. Olive
BY Munn & Co.
ATTORNEYS

O. H. OLIVE.
WATER MOTOR.
APPLICATION FILED OCT. 22, 1914.
1,157,416.
Patented Oct. 19, 1915.
2 SHEETS—SHEET 2.
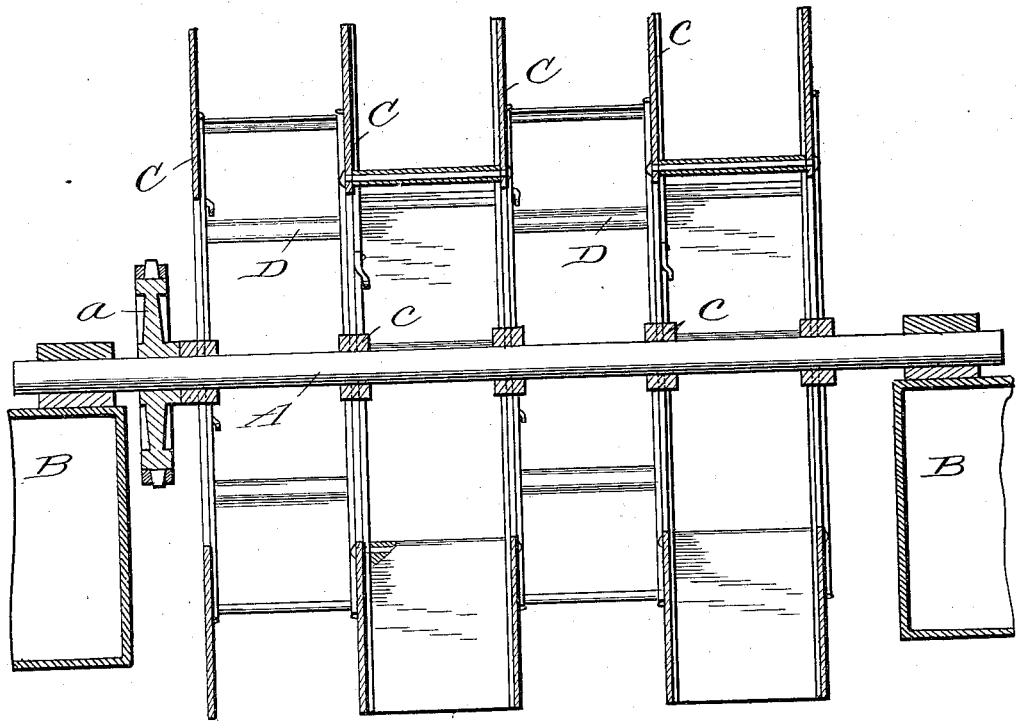
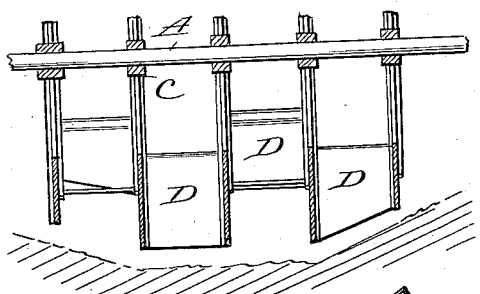
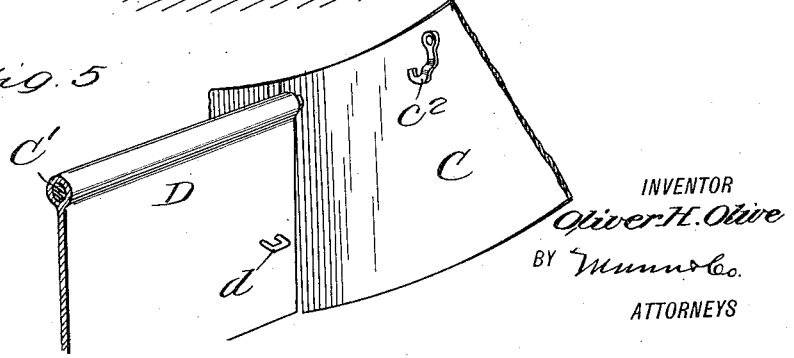
WITNESSES
INVENTOR
Oliver H. Olive
BY Munn & Co.
ATTORNEYS

UNITED STATES PATENT OFFICE.

OLIVER HENRY OLIVE, OF INDIANOLA, IOWA.

WATER-MOTOR.

1,157,416. Specification of Letters Patent. Patented Oct. 19, 1915.

Application filed October 22, 1914. Serial No. 868,017.

*To all whom it may concern:*

Be it known that I, OLIVER H. OLIVE, a citizen of the United States, and a resident of Indianola, in the county of Warren and State of Iowa, have invented an Improvement in Water-Motors, of which the following is a specification.

My present invention relates generally to water motors, and more particularly to a water motor including a plurality of water wheels, the construction of each of which wheels, and the relation between which wheels, are such as that the impact elements of any one of the wheels cannot destroy or impair the effect of the current upon those of the other wheel or wheels.

The object of my invention is to provide a pair of water wheels each having a plurality of series of blades, the blades of each series being connected to the respective wheel and spaced therearound at 90° with respect to one another, and the wheels being connected to rotate in a permanently definite relation and with their corresponding series of blades turned so that one assumes a position in advance of the other equal to 45°.

Figure 1:
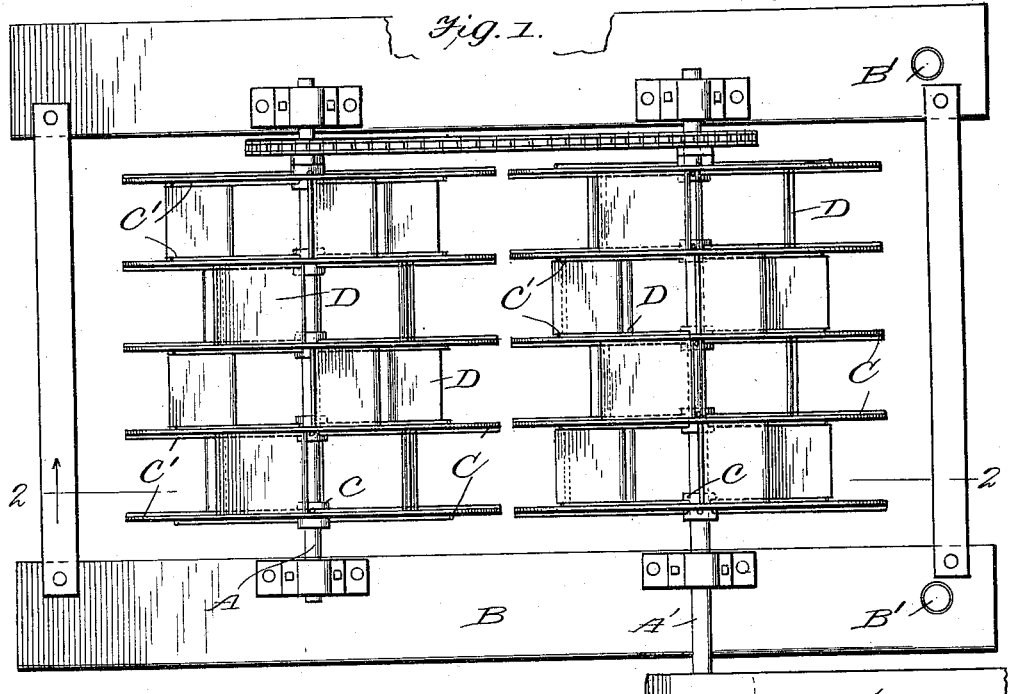
Figure 2:
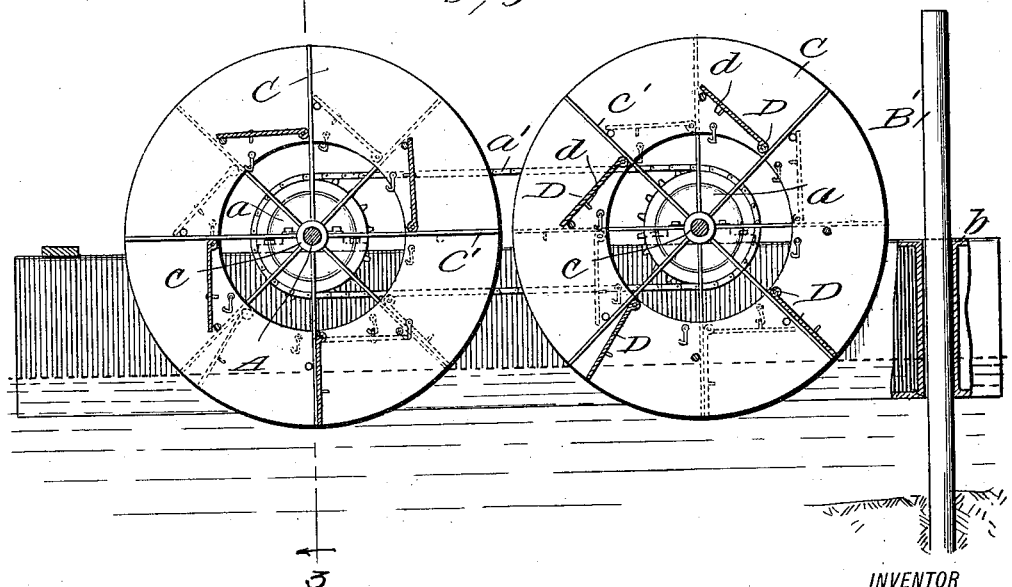

Referring now to the accompanying drawings, in which my invention is illustrated, Figure 1 is a plan view illustrating my improvements. Fig. 2 is a vertical longitudinal section taken substantially on line 2—2 of Fig. 1. Fig. 3 is a vertical cross section taken substantially on line 3—3 of Fig. 2. Fig. 4 is a vertical cross section through the lower portion of a wheel the circumference of which is increased at its center, and Fig. 5 is a detail perspective view of a portion of one of the paddles and one of the adjacent wheel disks, broken away.

Referring now to these figures I preferably mount a pair of transverse shafts A and A' across a supporting float frame B, each of said shafts carrying a power wheel and each being provided with a sprocket wheel $a$ connected by a sprocket chain $a'$ whereby to maintain the power wheels and the shafts A and A' in permanently-fixed relation with respect to one another.

The float frame B may have vertical sockets $b$ as best seen in Figs. 1 and 2 whereby to mount the same upon piles and the like B' and thus permit the frame to automatically adjust itself vertically upon the rise and fall of the stream or other body of water in which the motor is disposed for operation, thus tending to maintain the water wheels in uniform depth within the current. The shaft A' may also, as shown in Fig. 1, be extended laterally at one side of the frame B and provided with a pulley or like member for connection by a belt and the like A² in order to transmit the developed power to a distant point for utilization.

Each of the wheels mounted upon the shafts A and A' consists of a plurality of circular disks C secured upon the shaft in uniformly spaced relation in order to provide for the reception of the impact receiving paddles between these disks, there being a series of such paddles disposed in the space between each pair of said disks.

The paddles D of each series are hingedly connected at their inner ends to rods C' extending between and connected to, the several disks C and forming additional supports for the latter, the paddles thus connected being disposed at equi-distantly spaced points in and around the channel between two adjacent disks C at substantially 90° with respect to one another.

Each of the disks C has an inner hub $c$ and a plurality of radial ribs $c'$ alternate ones of which are extended outwardly upon its relatively opposite faces so as to form supports for the several paddles D upon opposite sides thereof, to prevent the latter from swinging inward in one direction.

In the other direction the several paddles are free to move inwardly on the rods C' before mentioned and may be locked in inner inoperative positions due to the provision of eyes $d$ upon the paddles themselves and hooks $c^2$ around the disks C to engage said eyes.

It will be noted that the several disks C on the two water wheels are alined and that the wheels, each of which is constructed as before described, are caused to rotate in permanently fixed relation due to their gearing connections before mentioned and consisting of sprocket wheels $a$ and a connecting sprocket chain $a'$.

It will be further seen that the two wheels so constructed and so connected are in the first instance turned slightly with respect to one another so that of their several alined series of paddles, the paddles of one are in advance of those of the other a distance equal to 45° whereby in the operation of the wheels, the paddles of one wheel cannot by any possibility impair or destroy the action of the current upon the paddles of the other wheel. Of course, to do this it will be at once seen that the members of the paddles of each series may not exceed four and by reference to Fig. 2 in particular, it will be seen that I preferably stagger the paddles of each of the wheels without destroying the particular relation before described as existing between the wheels. Water wheels so constructed and arranged will effectively serve the purposes for which motors of this character are intended and will enable each of the wheels to be formed either with the same circumference throughout or with a circumference greatly increased at the center of the wheel and conforming somewhat to the slope of the bed of the stream as clearly seen by reference to Fig. 4.

I claim:—

1. A water motor consisting of a float frame, a pair of undershot water wheels mounted in the float frame and each consisting of a plurality of spaced disks forming channels therebetween, a series of paddles mounted in each of the said channels between the disks, the paddles of each series being disposed at 90° with respect to one another around the wheel, rods connecting and supporting the disks and upon which the inner ends of the said paddles are hingedly connected, each of the said disks having a hub and radially projecting rods extending from the hub and projecting upon alternately opposite sides of the disks whereby to form supports for the paddles to prevent their inward swinging movement in one direction, relatively engageable hooks and eyes carried by the disks and paddles for securing the latter in inoperative positions, the several series of paddles of each wheel being staggered with respect to one another and being in advance of the alined paddle series of the other wheel a distance equal to 45°, and gearing connecting the said wheels and maintaining the same in permanently fixed relation at all times.

2. A water motor consisting of a float frame, a pair of wheels journaled across the float frame in parallel contiguous relation, each wheel consisting of a plurality of spaced disks forming channels therebetween, a series of blades hingedly connected at their inner ends to the disks and disposed in the channels between the disks, the paddles of each series being spaced at 90° with respect to one another and the series of paddles being staggered with respect to one another along each of the wheels, the said wheels being relatively positioned so that their corresponding series of paddles are in advance of one another a distance equal to 45°, and gearing connecting the wheels and maintaining the same in permanently fixed relation at all times.

3. A water motor consisting of a float frame, wheels journaled across the float frame in parallel contiguous relation and rotating in the same direction, each wheel consisting of a plurality of spaced disks forming channels therebetween, a series of blades disposed in each channel and hingedly connected at their inner ends to the adjacent disks, the blades of each series being spaced from one another and the series of blades being staggered with respect to one another along each of the wheels, the said wheels being relatively positioned so that their corresponding series of paddles are in advance of one another, and gearing connecting the wheels.

OLIVER HENRY OLIVE.

Witnesses:
MARY B. OLIVE,
WALTER A. OLIVE.

Copies of this patent may be obtained for five cents each, by addressing the "Commissioner of Patents, Washington, D. C."